United States Patent
Yang et al.

(10) Patent No.: US 7,193,769 B2
(45) Date of Patent: Mar. 20, 2007

(54) TWO PARTICLE ELECTOPHORETIC SYSTEMS, ELECTRONIC DISPLAYS INCLUDING TWO PARTICLE ELECTOPHORETIC SYSTEMS, AND METHODS FOR PRODUCING THE TWO PARTICLE ELECTOPHORETIC SYSTEMS

(75) Inventors: San-Ming Yang, Mississauga (CA); Ahmed Hoyshel Alzamly, Mississauga (CA); Man-Chung Tam, Mississauga (CA); Peter Michael Kazmaier, Mississauga (CA); Thomas Edward Enright, Tottenham (CA)

(73) Assignee: Xerox Corporation, Stamford, CT (US)

( * ) Notice: Subject to any disclaimer, the term of this patent is extended or adjusted under 35 U.S.C. 154(b) by 18 days.

(21) Appl. No.: 11/128,162

(22) Filed: May 13, 2005

(65) Prior Publication Data

US 2006/0256422 A1    Nov. 16, 2006

(51) Int. Cl.
*G02B 26/00* (2006.01)
*G03G 17/04* (2006.01)

(52) U.S. Cl. ........................... 359/296; 430/32

(58) Field of Classification Search ............... 359/296, 359/900; 345/105, 107; 204/450, 600; 430/32, 430/34, 38
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 5,389,945 A | 2/1995 | Sheridon | |
| 5,739,801 A | 4/1998 | Sheridon | |
| 6,517,618 B2 * | 2/2003 | Foucher et al. | 106/31.16 |
| 6,525,848 B2 * | 2/2003 | Cao | 359/107 |
| 6,721,083 B2 * | 4/2004 | Jacobson et al. | 359/296 |
| 6,839,158 B2 * | 1/2005 | Albert et al. | 359/296 |
| 2004/0119680 A1 | 6/2004 | Daniel et al. | |

* cited by examiner

*Primary Examiner*—Ricky Mack
*Assistant Examiner*—Tuyen Tra
(74) *Attorney, Agent, or Firm*—Oliff & Berridge, PLC

(57) ABSTRACT

An electrophoretic display includes a transparent polymeric film including at least one cavity including a first particle species and a second particle species. Application of an electrical field causes the first particle species and the second particle species to separate from one another, and align on opposite sides of the cavity. Subsequent electric field applications cause migration of the first and second particle species, affecting a color state of the display. The electrophoretic display may be fabricated from multiple display cells arranged on a substrate.

16 Claims, 4 Drawing Sheets

TWO PARTICLE ELECTOPHORETIC SYSTEMS, ELECTRONIC DISPLAYS INCLUDING TWO PARTICLE ELECTOPHORETIC SYSTEMS, AND METHODS FOR PRODUCING THE TWO PARTICLE ELECTOPHORETIC SYSTEMS

BACKGROUND

This disclosure relates to the field of visual displays. In particular, it relates to visual displays including two-particle electrophoretic systems having a controlled response to tribo-electric charging effects. More particularly, this disclosure relates to large area visual displays including two-particle electrophoretic systems having a controlled response to tribo-electric charging effects.

Paper has traditionally been a preferred medium for the presentation and display of text and images. Paper has several characteristics that make it a desirable display medium, including the fact that it is lightweight, thin, portable, flexible, foldable, high-contrast, low-cost, relatively permanent, and readily configured into a myriad of shapes. It can maintain its displayed images without using any electricity. Paper can also be read in ambient light and can be written or marked upon with a pen, pencil, paintbrush, or any number of other implements, including a computer printer.

Unfortunately, paper is not well suited for large-area or real-time display purposes. Real-time imagery from computer, video, or other sources cannot be displayed directly with paper, but must be displayed by other means, such as by a cathode-ray tube (CRT) display or a liquid-crystal display (LCD). However, real-time display media lack many of the desirable qualities of paper, such as stable retention of the displayed image in the absence of an electric power source.

Electric paper combines the desirable qualities of paper with those of real-time display media. Like ordinary paper, electric paper can be written and erased, can be read in ambient light and can retain imposed information in the absence of an electric field or other external retaining force. Also like ordinary paper, electric paper can be made in the form of a light-weight, flexible, durable sheet that can be folded or rolled into a tubular form about any axis and placed into a shirt or coat pocket, and then later retrieved, re-straightened, and read without loss of information. Yet unlike ordinary paper, electric paper can be used to display full-motion and other real-time imagery as well as still images and text. Thus, electric paper can be used in a computer system display screen or a television.

Traditionally, electronic displays such as liquid crystal displays have been made by sandwiching an optoelectrically active material between two pieces of glass. In many cases, each piece of glass has an etched, clear electrode structure formed using indium tin oxide (ITO). A first electrode structure controls all the segments of the display that may be addressed, that is, changed from one visual state to another. A second electrode, sometimes called a counterelectrode, addresses all display segments as one large electrode, and is generally designed not to overlap any of the rear electrode wire connections that are not desired in the final image. Alternatively, the second electrode is also patterned to control specific segments of the display. In these displays, unaddressed areas of the display have a defined appearance.

Electrophoretic displays offer many advantages compared to liquid crystal displays. Electrophoretic display media are generally characterized by the movement of particles through an applied electric field. Encapsulated electrophoretic displays also enable the display to be printed. These properties allow encapsulated electrophoretic display media to be used in many applications for which traditional electronic displays are not suitable, such as flexible displays. Additionally, electrophoretic displays typically have attributes of good brightness, wide viewing angles, high reflectivity, state bistability, and low power consumption when compared with liquid crystal displays. However, problems with the image quality, specifically the contrast, to date has been less than optimal. Contrast is defined as the ratio of the white state to the dark state reflectance of the display. Contrast enables the eye to easily distinguish between light and dark.

The gyricon, also called the twisting-ball display, rotary ball display, particle display, dipolar particle light valve, etc., provides a technology for making electric paper and electrophoretic displays. A gyricon display is a display that can be altered or addressed. A gyricon display is made up of a multiplicity of optically anisotropic balls which can be selectively rotated to present a desired surface to an observer.

The optical anisotropy of the gyricon balls is provided by dividing the surface of each gyricon ball into two or more portions. One portion of the surface of each gyricon ball has a first light reflectance or color. At least one other portion of the surface of the gyricon ball has a different color or a different light reflectance. For example, a gyricon ball can have two distinct hemispheres, one black and the other white. Additionally, each hemisphere can have a distinct electrical characteristic, such as, for example, a zeta potential with respect to a dielectric fluid. Accordingly, the gyricon balls are electrically as well as optically anisotropic. It is conventionally known that when particles are dispersed in a dielectric liquid, the particles acquire an electric charge related to the zeta potential of their surface coating.

The black-and-white gyricon balls are embedded in a sheet of optically transparent material, such as an elastomer layer, that contains a multiplicity of spheroidal cavities. Each of the spheroidal cavities is permeated by a transparent dielectric fluid, such as a plasticizer. The fluid-filled cavities accommodate the gyricon balls, one gyricon ball per cavity, to prevent the balls from migrating within the sheet. Each cavity is slightly larger than the size of the gyricon ball so that each gyricon ball can rotate or move slightly within its cavity.

A gyricon ball can be selectively rotated within its respective fluid-filled cavity by applying an electric field, so that either the black or white hemisphere of the gyricon ball is exposed to an observer viewing the surface of the sheet. By applying an electric field in two dimensions, for example, using a matrix addressing scheme, the black and white sides of the balls can be caused to appear as the image elements, e.g., pixels or subpixels, of a displayed image.

Conventional gyricon displays are described further in U.S. Pat. Nos. 4,126,854; 4,143,103; 5,389,945 and 5,739,801 to Sheridon, the disclosures of which are incorporated herein in their entirety. Gyricon displays can be made that have many of the desirable qualities of paper, such as flexibility and stable retention of a displayed image in the absence of power, that are not found in CRTs, LCDs, or other conventional display media. Gyricon displays can also be made that are not paper-like, for example, in the form of rigid display screens for flat-panel displays.

However, electronic papers such as gyricon displays are not necessarily compatable with low resolution applications and large area, outdoor electronic signage. In order to achieve a gyricon contrast ratio of about 8 and a white reflectivity of from 20–22% up to 28% requires the gyricon beads have a 90–95% perfect bichromality, the distinct equatorial separation of black and white hemisphere. In addition, the color axis and dipole moment axis of the beads must be aligned, and all the beads must complete their rotation. In addition, the layer of spherical capsules in which the beads are located is a major contributor to optical reflectivity, but hexagonal close packed spheres only occupies 90.7% of this layer. Gyricon devices are usually made into a multilayer configuration to enhance optical performance. For high-brightness large-area visual displays, 100% coverage of reflective surface is desired. These requirements pose significant challenges in low resolution applications and large area electronic signage.

One example of electrophoretic displays being developed to address the challenges of low resolution applications and large-area electronic signage involves an electrophoretic ink that uses spherical cells or microcapsules filled with black and white particles. The particles can be manipulated to position themselves on the top or the bottom of the microcapsule or cell to generate black or white surface visibility to an observer. Specifically, the particles are oriented or translated by placing an electric field across the cell. The electric field typically includes a direct current field, which may be provided by at least one pair of electrodes disposed adjacent to a display comprising the cell. Once set for a black state or a white state, the display maintains its color until a different configuration is forced through the application of a subsequent electrical field.

Such two-particle electrophoretic capsule systems, which have a contrast ratio of about 10 and a whiteness of more than 35%, are commercially available. However, these products are limited to small area displays, such as a personal digital assistants (PDAs) or handheld E-book, because a uniform close-pack coating of spherical capsules over large area is difficult to achieve where spherical capsules are deformed into a closed packed layer. Also, the electrophoretic ink systems cannot tolerate outdoor environmental conditions.

Such electrophoretic displays are disclosed, for example, in U.S. Patent Application Publication US 2004/0119680 to Daniel et al., which describes the switching of a two-particle electrophoretic display comprising two-particle electrophoretic ink consisting of a first particle species of a first color (e.g. white) and a second particle species of a second color (e.g. black) suspended in a clear medium. The disclosure of Daniel is incorporated herein in its entirety. The different colored particles of Daniel carry opposite charges, and the charged particles are moved by DC current application to change the electrophoretic display.

These two-particle electrophoretic systems are well recognized as providing good black and white electronic displays, but are currently limited by difficulties in making large area display media.

Thus, there remains a need for electrophoretic displays having good optical performance at high and low resolutions. There also remains a need for electrophoretic displays that can be used for large area and/or outdoor visual displays.

SUMMARY

This disclosure provides improved two-particle electrophoretic display systems. In particular, this disclosure provides a two-particle electrophoretic system for visual displays, along with methods and materials for use in such systems.

Electrophoretic displays, in embodiments, include one or more thin media sheets, one or more pairs of electrodes and one or more sources of electrical charge. The thin media sheets are made from polymeric materials and include one or more cavity that contains two species of oppositely charged particles. These species differ from each other in charge as well as in at least one other physical characteristic, such as optical characteristics.

Additional embodiments are directed to processes for preparing thin media sheets for use in electrophoretic displays, such as those discussed above. These processes include steps of separately preparing first and second species of oppositely charged particles, preparing composite particles including a sacrificial material and the first and second species of charged particles, encapsulating one or more of the composite particles in a transparent material, preparing a thin film of the transparent material and encapsulated composite particles, and removing the sacrificial material to form cavities in the transparent thin film.

In addition, disclosed embodiments are directed to methods of electrophoretic display, in which electrophoretic displays are provided and electrical charges or voltages are applied to affect at least one optical characteristic of the electrophoretic display. In such methods, the electrophoretic display includes one or more sources of electrical charge, one or more pairs of electrodes and one or more thin media sheets.

These and other features and advantages of various exemplary embodiments of materials, devices, systems and/or methods according to this disclosure are described in, or are apparent from, the following detailed description of the various exemplary embodiments of the methods and systems according to this disclosure.

BRIEF DESCRIPTION OF THE DRAWINGS

The exemplary embodiments of the invention will be described in detail, with reference to the following figures in which.

DETAILED DESCRIPTION OF EMBODIMENTS

Figure 1A:
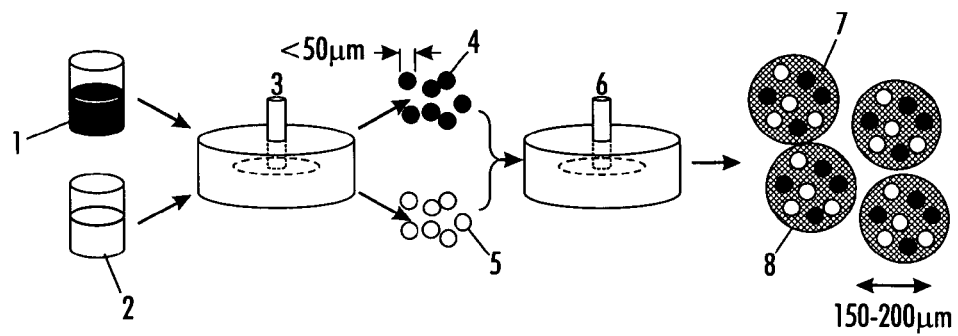
FIGS. 1A–1C are schematic drawings representing processes for preparing exemplary embodiments of electrophoretic display capsules.

Preferred embodiments will be described in detail below with reference to drawings in some cases. In the drawings, the same reference numerals and signs are used to designate the same or corresponding parts, and repeated descriptions are avoided.

This disclosure relates to improved encapsulated electrophoretic displays and, more particularly, to the colored states and resultant contrast of such displays. Generally, an encapsulated electrophoretic display includes two species of particles that either absorb or scatter light.

This disclosure also relates to a new approach for creating large-area visual displays having high brightness and low-cost fabrication. This approach can be extended to high resolution electronic paper. In particular, a novel process for fabricating a large-area two-particle electrophoretic media is provided. In this process, two species of small charged particles are prepared and incorporated into a sacrificial material to create composite particles. The composite particles are then encapsulated in a polymeric material that is then formed into a sheet. The polymer sheet is treated to remove the sacrificial material, resulting in a polymeric sheet that includes cavities containing the charged particles.

The electrophoretic display systems of this disclosure include two species of charged particles. The two species of charged particles differ from each other in charge and in terms of at least one other physical characteristic, such as color, fluorescence, phosphorescence, retroreflectivity, etc., that distinguishes one species of particles from the other species and provides the basis for their separation. For example, the two species of charged particles are colored differently and have different surface charges. The two species of charged particles of embodiments are small particles that are generally about 50 µm or less in diameter. The two species carry opposite charges; that is, one species of charged particles carries a positive charge and the other carries a negative charge. The two species of charged particles can be separately prepared by any suitable process, such as a mechanical spinning process. These charged particles are not particularly limited in shape. In exemplary embodiments, the small charged particles are spherical, but may be any desired shape or configuration, such as cylinders, prisms or the like.

Figure 1B:
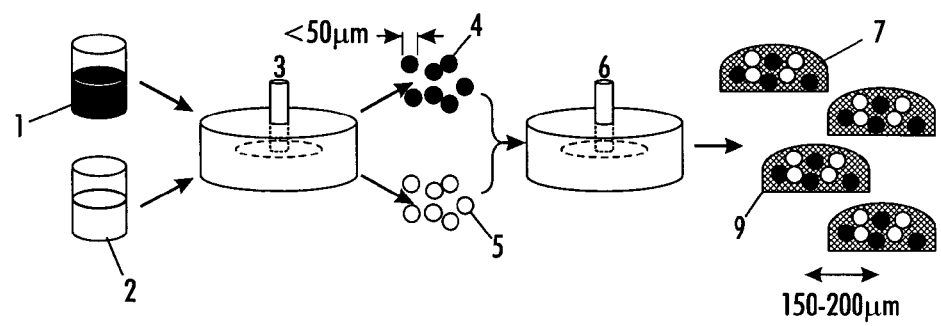
Figure 1C:
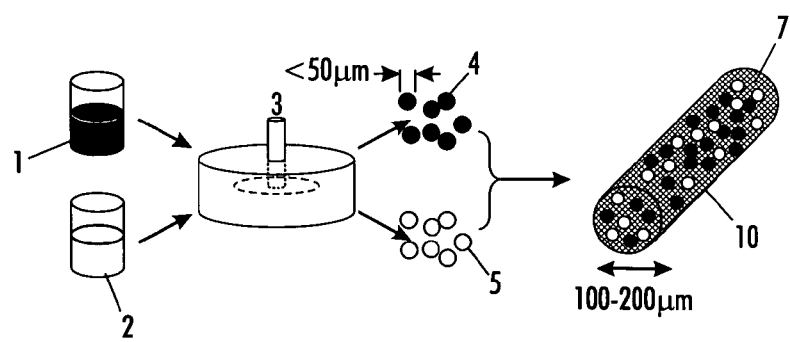

As shown in FIGS. 1A–1C, two exemplary species of charged particles are produced by mechanical spinning of the components of each species, black 1 and white 2, in a monochrome spinner 3. One particle species 4 having a black color and one particle species having a white color 5 are individually obtained. In some embodiments, the black colored particles 4 carry a positive charge, while the white colored particles 5 carry a negative charge. The particle size can range from about 0.1 µm to about 50 µm.

The composition of the two species of small charged particles is also not particularly limited. In embodiments, the small charged particles include at least a hardenable material, a charge additive, and a colorant that may be the same as or different from the charge additive.

Of the above components, the two species may include the same or different hardenable material. Hardenable materials that may be used in embodiments include glass, silicon resins, high-temperature melting waxes, UV curable resins, thermocurable resins, hot-melt resins, and mixtures thereof.

Thus, in embodiments, the hardenable material of a species of charged particles may be one or more resin selected from the group consisting of thermoset resins, curable resins, thermoplastic resins and mixtures thereof. Non-limiting examples of suitable resins include epoxy resins, poly-functional epoxy resins, polyol resins, polycarboxylic acid resins, poly (vinylidene fluoride) resins, polyester resins, carboxy-functional polyester resins, hydroxy-functional polyester resins, acrylic resins, functional acrylic resins, polyamide resins, polyolefin resins, plasticized PVC, polyester and poly (vinylidene fluoride), ionomers, styrene, copolymers comprising styrene and an acrylic ester and mixtures thereof.

In embodiments, the hardenable material of a species of charged particles may be one or more high-temperature melting waxes selected from the group consisting of natural vegetable waxes, natural animal waxes, mineral waxes, synthetic waxes and functionalized waxes. The high-temperature melting waxes of embodiments have a melting point in a range of from about 70° C. to about 300° C.; in certain embodiments, the high-temperature melting waxes may have a melting point in a range of from about 90° C. to about 180° C. Examples of high-temperature melting natural vegetable waxes include, for example, carnauba wax, candelilla wax, Japan wax, and bayberry wax. Examples of high-temperature melting natural animal waxes include, for example, beeswax, punic wax, lanolin, lac wax, shellac wax, and spermaceti wax. High-temperature melting mineral waxes include, for example, paraffin wax, microcrystalline wax, montan wax, ozokerite wax, ceresin wax, petrolatum wax, and petroleum wax. High-temperature melting synthetic waxes include, for example, Fischer-Tropsch wax, acrylate wax, fatty acid amide wax, silicone wax, polytetrafluoroethylene wax, polyethylene wax, and polypropylene wax, and mixtures thereof. Preferably, the hardenable material is a linear polyethylene wax, such as POLYWAX® 2000 (available from Baker Petrolite), which has a molecular weight of about 2000.

The charge additive of embodiments is a component that is charged or capable of acquiring a charge. The two species of charged particles generally include different charge additives, so that the two species of charged particles carry opposite charges. In embodiments in which the charge additive is a component capable of aquiring a charge, the particle charge is generated by triboelectric charging during the mechanical spinning step that produces the particles. In embodiments, the charge additive is used in suitable effective amounts. In embodiments, the charge additive is used in amounts from about 0.1 to about 15 percent by weight of the charged particle. In embodiments, the charge additive is used in amounts from about 1 to about 15 percent by weight of the charged particle, preferably, in amounts from about 1 to about 3 percent by weight of the charged particle. Suitable charge additives in embodiments include, for example, alkyl pyridinium halides; bisulfates; positive charge enhancing additives, such as the BONTRON series of charge controlling agents (available from Orient Chemical Industries, Ltd.) and the COPY CHARGE series of charge controlling agents (available from Clariant AG Corporation); and negative charge enhancing additives, such as, for example, aluminum complexes, and other charge additives known in the art or later discovered or developed.

The two species of charged particles also each include, in embodiments, at least one colorant. The colorant of each species is generally different from the colorant of the other species. In various embodiments, a colorant may be included in a suitable amount, to achieve a desired color strength. In embodiments, the at least one colorant is included in an amount of from about 1 to about 40 percent by weight of the charged particle, preferably in an amount of from about 10 to about 30 percent by weight of the charged particle.

Colorants that may be incorporated into embodiments include pigments, dyes, mixtures of pigments, mixtures of dyes and mixtures of pigments with dyes, and the like. In general, one species of charged particles will include a black colorant and the other species will include a white colorant. However, various known white, black, cyan, magenta, yellow, red, green, brown, or blue colorants, or mixtures thereof may be incorporated into the two species of charged particles of embodiments. The colorant may have, in embodiments, a mean colorant size in a range of from about 50 to about 3000 nm, preferably in a range of from about 100 to 2000 nm. Examples of white colorants that may be used in electrophoretic displays according to embodiments include titanium oxide, aluminum oxide, and silicon oxide. Examples of black colorants that may be used in electrophoretic displays according to embodiments include absorptive materials, such as carbon black or colored pigments used in paints and ink.

The two species of charged particles are mechanically incorporated into a sacrificial material to create composite particles. As shown in FIGS. 1A–1C, one particle species 4 having a black color, one particle species having a white color 5 and a sacrificial material 7 are combined to produce composite particles.

The composite particles may have any desired shape. In embodiments, the composite particles may be spherical 8, discoid 9 or cylindrical 10. In FIGS. 1A and 1B, the sacrificial material and the two exemplary species of charged particles are combined by mechanical spinning of the components in a monochrome spinner 6 to produce spherical and discoid composite particles, respectively. In FIG. 1C, cylindrical composite particles are produced by mixing the sacrificial material and the two exemplary species of charged particles and either extruding or injection molding the mixture. Spherical or discoid composite particles of embodiments may have diameters in a range of from about 100 μm to about 200 μm. Cylindrical composite particles of embodiments may have any desired length, such as from about 0.5 to about 100 cm, preferably from about 1 to about 20 cm; such cylindrical composite particles may have diameters in a range of from about 100 μm to about 200 μm. In particular embodiments, the diameters of spherical, discoid or cylindrical composite particles may be in a range of from about 150 μm to about 200 μm.

The sacrificial material used in embodiments is limited only in its ability to diffuse through the transparent polymeric material, described below. In embodiments, the sacrificial material may be one or more low-temperature melting waxes selected from the group consisting of natural vegetable waxes, natural animal waxes, mineral waxes, synthetic waxes and functionalized waxes. The low-temperature melting waxes of embodiments have a melting point in a range of from about 45° C. to about 95° C.; in certain embodiments, the low-temperature melting waxes may have a melting point in a range of from about 65° C. to about 85° C. Examples of low-temperature melting natural vegetable waxes include, for example, Japan wax, and bayberry wax. Examples of low-temperature melting natural animal waxes include, for example, beeswax, punic wax, lanolin, lac wax, shellac wax, and spermaceti wax. Low-temperature melting mineral waxes include, for example, paraffin wax, microcrystalline wax, montan wax, ozokerite wax, ceresin wax, petrolatum wax, and petroleum wax. Low-temperature melting synthetic waxes include, for example, Fischer-Tropsch wax, acrylate wax, fatty acid amide wax, silicone wax, polytetrafluoroethylene wax, polyethylene wax, and polypropylene wax, and mixtures thereof. Preferably, the sacrificial material is a linear polyethylene wax, such as POLYWAX® 400 (available from Baker Petrolite), which has a molecular weight of about 400.

The composite particles are encapsulated inside the transparent polymeric material to form a thin media sheet 11. The composite particles act as a template to create a cavity inside the transparent polymer. After the polymeric material has cured to form a thin media sheet, the sacrificial material is removed from the encapsulated composite particles. After the removal of the sacrificial polymer, the electrophoretic particles are free to move inside the cavity. Removal of the sacrificial material may be accomplished by any suitable means. In embodiments, the sacrificial material is diffused through the cured polymeric material. For example, the thin media sheet may be heated and/or treated to cause the sacrificial material to diffuse through polymeric material.

Figure 2A:
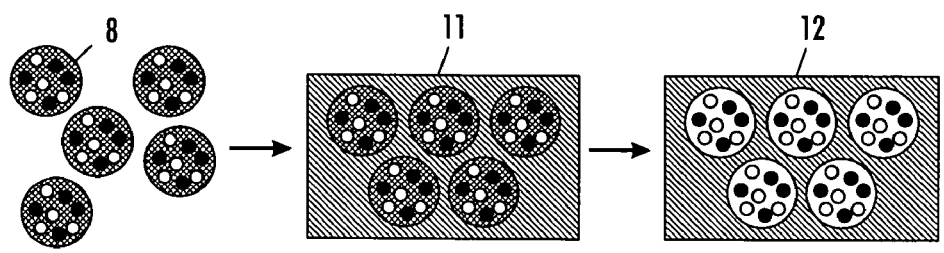
FIGS. 2A–2C are schematic drawings representing the processes for preparing exemplary embodiments of electrophoretic display systems.
Figure 2B:
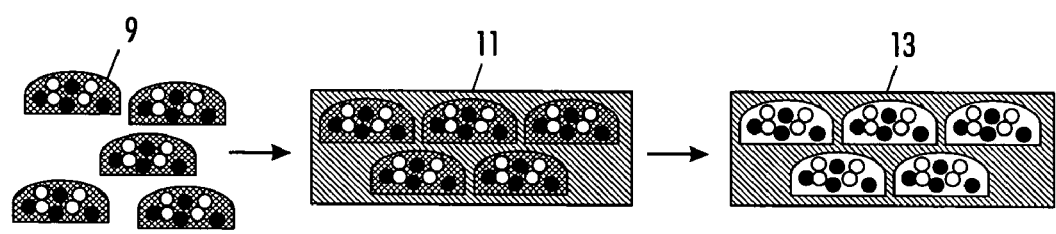
Figure 2C:
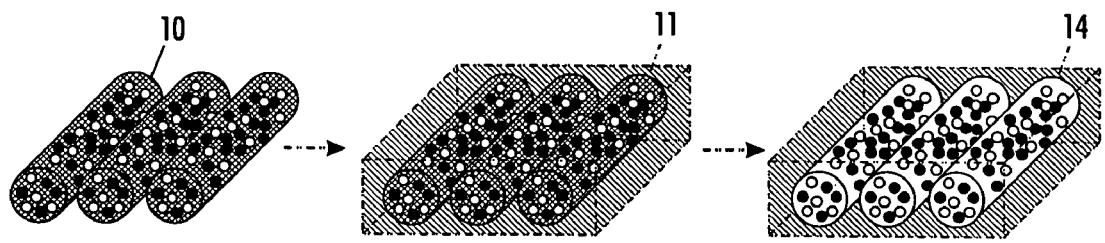

The number of composite particles included in a thin media layer is not particularly limited. In embodiments, composite particles are packed into a close arrangement and are individually encapsulated by the polymeric material. In particular, a closely packed layer of composite particles, the top or display layer, is created, optionally with additional layers of composite particles, as shown in FIGS. 2A–2C. FIGS. 2A and 2B show schematic side views of the formation of exemplary polymeric sheets 12 and 13 incorporating two layers of spherical or discoid composite particles, respectively. FIG. 2C shows a schematic oblique-side view of the formation of an exemplary polymeric sheet 14 incorporating a single layer of cylindrical composite particles.

Depending on the shape of the composite particles, the display layer of composite particles may cover more than about 90% of a reflective surface of the polymeric layer. In particular, closely packed cylindrical composite particles can achieve coverage of up to about 100% of a reflective surface of the polymeric layer.

The polymeric material used in embodiments to form the polymeric sheet is not particularly limited. In embodiments, the polymeric material includes one or more polymeric material selected from elastomeric materials, such as silicones, including room-temperature vulcanized silicones; thermally or UV-curable polyurethane resins; thermally or UV-curable epoxy resins; and one or more curing agents.

Once the composite particles have been arranged in the polymeric material, the polymeric material is cured to form a thin media sheet. Curing may be accomplished by any suitable method, such as thermal curing, UV curing, moisture curing, electron-beam curing, and gamma-radiation curing.

An encapsulated electrophoretic display can be constructed so that the optical state of the display is stable for some length of time. When the display has two states that are stable in this manner, the display is said to be bistable. Bistable displays are displays in which any optical (colored) state remains fixed once the addressing voltage is removed. For the purpose of embodiments using black and white species of charged particles, the bistable states represent white states and black states. Since the two species of charged particles in embodiments are oppositely charged, each species moves inside the cavity in a direction opposite to the other species, according to an externally applied voltage or electric field to form white and black states that are bistable and reflective. In the absence of an electric field, the particles are substantially immobile. The driving voltage can be as low as 100V.

Figure 3A:
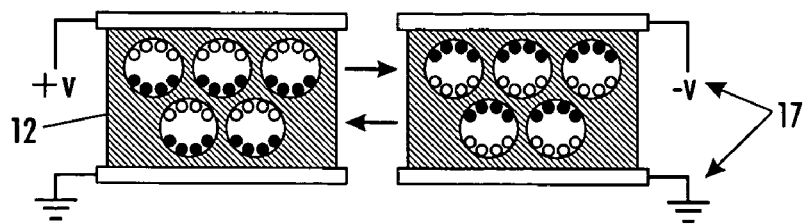
FIGS. 3A–3D are schematic cross-sectional views of exemplary embodiments of electrophoretic display systems.
Figure 3B:
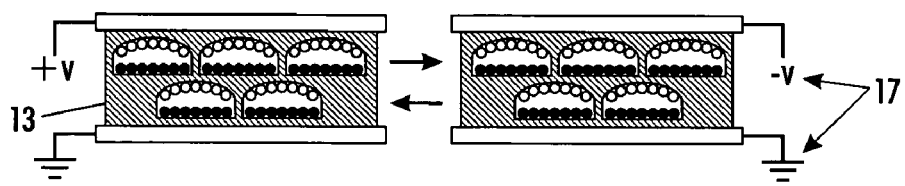
Figure 3C:
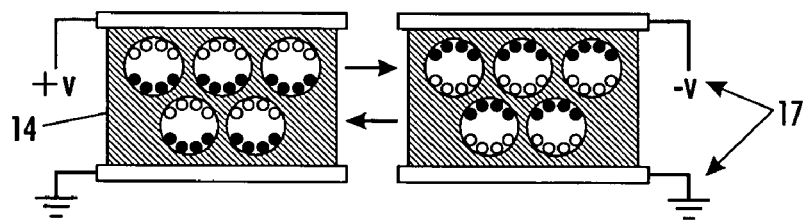
Figure 3D:
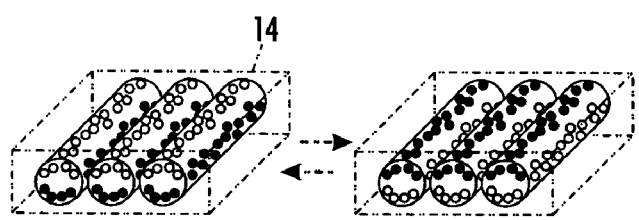

FIGS. 3A–3D schematically illustrate bistable white and black states in various exemplary embodiments. FIG. 3A shows a display including spherical cavities; FIG. 3B shows a display including discoid cavities; and FIGS. 3C and 3D show side and oblique-side views of displays including cylindrical cavities. In these Figures, bistable white and black states are produced by the application of a voltage to the electrophoretic thin media sheets containing positively charged black particles 4 and negatively charged white particles 5.

The different shapes of composite particles provide advantages. Non-spherical, discoid-shape cavities can be used to provide devices that can achieve higher brightness than those including corresponding spherical cavities, because the two species of charged particles can be distributed more evenly along the reflective surface and provided better optical performance. In addition, a thinner device, which may be operated with a lower driving voltage, can be made using discoid particles.

Electrophoretic display devices according to embodiments include the above described electrophoretic thin media sheet, at least one pair of electrodes 17, and at least one voltage source, such as, for example, a voltage source that provides an AC (alternating current) field or a DC (direct current) field.

The devices according to this disclosure provide multiple advantages over conventional gyricon devices and known two-particle display systems.

The two-particle display systems disclosed herein can be used to obtain large-area electrophoretic devices with whitenesses of up to about 28%, as compared to the 20–25% whitenesses that can be achieved with gyricon devices. In addition, devices according to this disclosure can achieve contrast ratios of about 10.

In addition, the two particle display systems disclosed herein avoid the problems associated with the bichromal beads of gyricon processes. If even one parameter is not properly set, the bichromality of gyricon beads will be very poor, resulting in poor optical performance. However, because the disclosed species are individually monochromatic, extensive time and effort to optimize and maintain the properties of black and white wax melts, such as temperature, viscosity, feed rate, disc rotation speed, chamber temperature, etc. need not be expended. The monochromatic species of this disclosure eliminate the problems of bichromality by separately formulating each species of charged particles.

Further, because the individual species of charged particles are separately formed, the material compositions of each can be individually studied, recycled and modified to obtain specific properties, such as viscosity, whiteness, blackness, charging, etc. In contrast, any change in the formulation of one side of a gyricon bichromal ball affects the bead making process and the rotational dynamic of the whole bead. In addition, bichromal beads that do not meet the required specifications cannot be recycled, resulting in wasted materials.

An additional advantage of the above-disclosed two-particle electrophoretic systems is that large-area visual displays may be prepared. Such displays may be prepared in unit dimensions of up to about 14–24 inches in width and up to about 50 to about 100 feet in length.

The above-described materials are known to be stable under environmental stresses, including prolonged outdoor use and exposure to the elements. Thus, embodiments of visual displays according to this disclosure may be used for outdoor E-signs.

EXAMPLES

Example 1

Preparation of Black Charged Particles

A pigmented wax comprising 20 percent by weight of a black pigment, FERRO F-6331 (a commercially available black metallic oxide from Ferro Corporation), 0.3 percent by weight of IGEPAL DM970 (a commercially available non-ionic surfactant from Sigma-Aldrich) and 79.7 percent by weight of POLYWAX 2000 (a commercially available linear polyethylene wax having a molecular weight of about 2000 from Baker Petrolite) was prepared using an extruder. This wax was melted at 150° C. and mechanically stirred for 2 hours at 1200–1500 rpm in a beaker to achieve good dispersion. The hot wax melt was then fed into a benchtop monochrome spinner as shown in FIG. 1. The disc of the spinner was set to 5930 rpm, and the shroud and nozzle temperatures were 170° C. and 125° C., respectively. Small black monochrome spheres having diameters of less than 50 µm were sieved and collected. The black particles were positively charged.

Example 2

Preparation of White Charged Particles

A pigmented wax comprising 30 percent by weight of a DUPONT R104 (a commercially available white titanium oxide pigment, $TiO_2$, commercially available from DuPont) and 70 percent by weight of POLYWAX 2000 was prepared using an extruder. This wax was melted at 150° C. and mechanically stirred for 2 hours at 1200–1500 rpm in a beaker to achieve good dispersion. The hot wax melt was then fed into a benchtop monochrome spinner as shown in FIG. 1. The disc of the spinner was set to 5930 rpm, and the shroud and nozzle temperatures were 170° C. and 125° C., respectively. Small white monochrome spheres having diameters of less than 50 µm were sieved and collected. The white particles were negatively charged.

Example 3

Figure 4A:
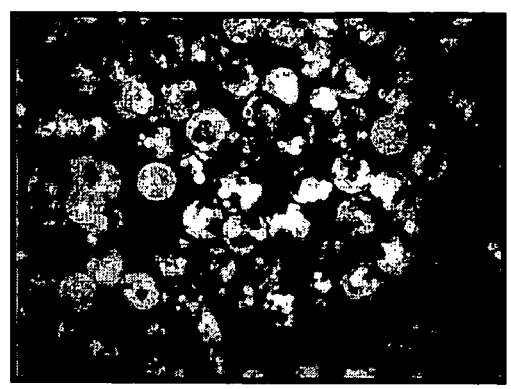
FIGS. 4A–4C are photomicrographs of an exemplary embodiment of an electrophoretic display having 150–180 μm composite spheres.

Preparation of Spherical Composite Particles 10 grams of the black particles of Example 1 and 10 grams of white particles of Example 2 were mixed well and placed into an oven at 90° C., and 25 grams of POLYWAX 400 (a commercially available linear polyethylene wax having a molecular weight of about 400 from Baker Petrolite) was separately melted inside the 90° C. oven. After two hours, the particles were added to the wax melt and stirred well. This mixture was kept at 90° C. and fed into a benchtop monochrome spinner as shown in FIG. 1. A strong cold air stream was purged inside the spinner to prevent the composite particle from touching the chamber wall. The disc of the spinner was set to 3700 rpm, the shroud and nozzle temperatures were 95° C. and 77° C., respectively. The spherical composite particles were collected and sieved. FIG. 4A is an optical micrograph of the composite particles, which had diameters in a range of 150 to 180 nm.

Example 4

Encapsulation of Spherical Composite Particles 6 grams of the spherical composite particles of Example 3 were mixed well with 6.6 grams of a silicone elastomer resub (commercially available from Dow Corning as SYLGARD 184 elastomeric kit in a ratio of 1/10 curing agent/resin). The mixture was degassed for 10–15 minutes, and a thin media layer of the mixture was coated onto a Mylar substrate using a doctor blade. The thin media layer was cured in a 60° C. oven for 12 hours to produce a thin media sheet. The final thickness was 330–360 µm.

Example 5

Extraction of Low-Temperature Melting Wax from Thin Media Sheet

A 2"×2" section of the thin media sheet of Example 4 was soaked in 150 ml of ISOPAR G (a commercially available isoparaffinic solvent from ExxonMobil), and then ultrasonicated for 30 minutes. The solvent was removed, 150 ml of fresh ISOPAR G was added, and the section was further sonicated for 60 minutes at 40° C. This step was repeated once to remove the POLYWAX 400. The thin media section was prepared for testing by washing and soaking the section in ISOPAR G.

Example 6

Device Fabrication

Figure 4B:
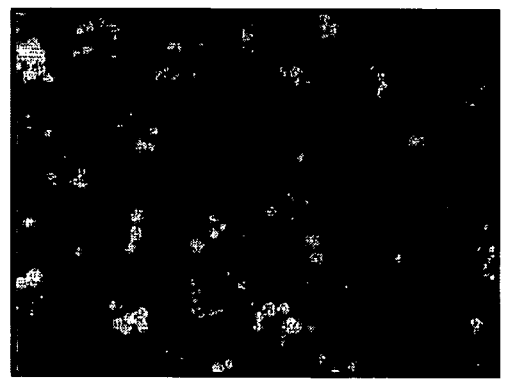
Figure 4C:
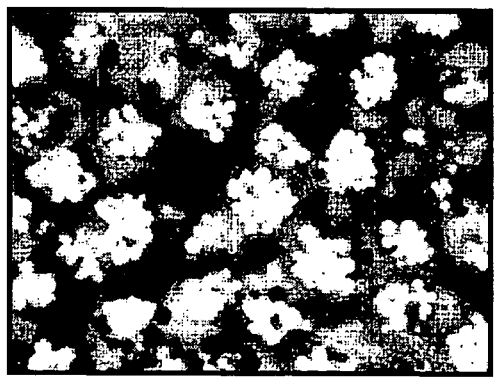

The thin media section sample of Example 5 was sandwiched between two ITO glass plates, and a square-wave voltage was applied across the media. The black and white state were photographed and are shown in FIGS. 4B and 4C. The contrast ratio of these images, and thus this device, is about 1.5 from 150 to 200 V.

Example 7

Device Fabrication

A 10"×10" thin media section sample was prepared as described above with respect to the 2"×2" sample of Example 6. Optical characterization was performed, and a contrast ratio of about 1.5 to about 2.0 was observed.

Example 8

Preparation of Discoid Composite Particles 10 grams of the black particles of Example 1 and 10 grams of white particles of Example 2 were mixed well and placed into an oven at 90° C., and 25 grams of POLYWAX 400 was separately melted inside the 90° C. oven. After two hours, the particles were added to the wax melt and stirred well. This mixture was kept at 90° C. and feed into a benchtop monochrome spinner as shown in FIG. 1. A strong cold air stream was purged inside the spinner to prevent the composite particle from touching the chamber wall. A non-stick surface, e.g. teflon sheet, is inserted between the spinning disc and chamber wall. The disc of the spinner was set to 3700 rpm, the shroud and nozzle temperatures were 95° C. and 77° C., respectively. The hot wax droplets hit the Teflon sheet, coalesced and solidified into a discoid shape. These discoids are collected and sieved into different sizes.

Example 9

Encapsulation of Discoid Composite Particles 6 grams of the discoid composite particles of Example 8 were mixed well with 6.6 grams of SYLGARD 184. The mixture was degassed for 10–15 minutes, and a thin media layer of the mixture was coated onto a Mylar substrate using a doctor blade. The thin media layer was cured at 60° C. oven for 12 hours to produce a thin media sheet. The final thickness was 330–360 µm.

Example 10

Extraction of Low-Temperature Melting Wax from Thin Media Sheet

A 2"×2" section of the thin media sheet of Example 9 was soaked in 150 ml of ISOPAR G, and then ultrasonicated for 30 minutes. The solvent was removed, 150 ml of fresh ISOPAR G was added, and the section was further sonicated for 60 minutes at 40° C. This step was repeated once to remove the POLYWAX 400. The thin media section was prepared for testing by washing and soaking the section in ISOPAR G.

Example 11

Device Fabrication

The thin media section sample of Example 10 was sandwiched between two ITO glass plates, and a square-wave voltage was applied across the media. The contrast ratio of these images, and thus this device, is about 1.5 from 150 to 200 V.

Example 12

Device Fabrication

A 10"×10" thin media section sample was prepared as described above with respect to the 2"×2" sample of Example 11. Optical characterization was performed.

Example 13

Preparation of Cylindrical Composite Particles 10 grams of the black particles of Example 1 and 10 grams of white particles of Example 2 were mixed well and placed into an oven at 90° C., and 25 grams of POLYWAX 400 was separately melted inside the 90° C. oven. After two hours, the particles were added to the wax melt and stirred well. This mixture was extruded into a fiber with a diameter of 100–200 µm. The composite fibers were collected and cut into appropriate lengths by tungsten carbide cutter (laser cutting may also be used to obtain appropriately sized fibers).

Example 14

Encapsulation of Cylindrical Composite Particles 6 grams of the cylindrical composite fibers of Example 13 were mixed well with 6.6 grams of SYLGARD 184. The mixture was degassed for 10–15 minutes, and a thin media layer of the mixture was coated onto a Mylar substrate using a doctor blade. The thin media layer was cured at 40–60° C. oven for 12 hours to produce a thin media sheet. The final thickness was 330–360 µm.

Example 15

Extraction of Low-Temperature Melting Wax from Thin Media Sheet

A 2"×2" section of the thin media sheet of Example 14 was soaked in 150 ml of ISOPAR G, and then ultrasonicated for 30 minutes. The solvent was removed, 150 ml of fresh ISOPAR G was added, and the section was further sonicated for 60 minutes at 40° C. This step was repeated once to remove the POLYWAX 400. The thin media section was prepared for testing by washing and soaking the section in ISOPAR G.

Example 16

Device Fabrication

The thin media section sample of Example 15 was sandwiched between two ITO glass plates, and a square-wave voltage was applied across the media. The contrast ratio of these images, and thus this device, is about 1.5 from 150 to 200 V.

Example 17

Device Fabrication

A 10"×10" thin media section sample was prepared as described above with respect to the 2"×2" sample of Example 16. Optical characterization was performed.

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electrophoretic display comprising:
    at least one thin media sheet;
    at least one pair of electrodes; and
    a source of electrical charge;
    wherein said thin media sheet comprises a polymeric material having therein at least one cavity; and
    wherein the at least one cavity contains at least a first species of charged particles and a second species of charged particles, and said first species of charged particles has a charge opposite to the charge of said second species of charged particles;
    wherein said first species of charged particles comprises a first hardenable material, a first charge additive, and a first colorant; and said second species of charged particles comprises a second hardenable material, a second charge additive, and a second colorant; and
    wherein said first hardenable material and said second hardenable material are individually chosen from the group consisting of glass, silicon resins, and mixtures thereof.

2. The electrophoretic display according to claim 1, wherein said polymeric material is at least one polymer chosen from the group consisting of elastomeric materials.

3. The electrophoretic display according to claim 2, wherein said polymeric material is a silicone.

4. The electrophoretic display according to claim 1, wherein said at least one cavity has a shape chosen from the group consisting of spherical shapes, discoid shapes and cylindrical shapes.

5. The electrophoretic display according to claim 1, wherein said first charge additive is at least one positive charge additive and wherein said second charge additive is at least one negative charge additive.

6. The electrophoretic display according to claim 1, wherein said first colorant and said second colorant are different and are each chosen from the group consisting of white and black colorants.

7. A process for preparing a thin media sheet for use in an electrophoretic display, comprising:
    preparing a first species of charged particles;
    preparing a second species of charged particles;
    preparing composite particles including a sacrificial material and said first species and said second species of charged particles;
    encapsulating at least one of said composite particles in a transparent polymeric material;
    forming said transparent polymeric material including said at least one encapsulated composite particle into a film; and
    removing said sacrificial material from said film to form at least one cavity in said thin media sheet, said cavity including said first species and said second species of charged particles;
    wherein said first and said second species of charged particles have opposite charges and differ from each other in at least one of the physical characteristic of color fluorescence, phosphorescence and retroreflectivity.

8. The process according to claim 7, wherein said preparing a first species of charged particles and said preparing a first species of charged particles each comprise the steps of
    mixing a hardenable material, a charge additive and a colorant; and
    forming charged particles.

9. The process according to claim 8, wherein said hardenable material is chosen from the group consisting of glass, silicon, resins, high-temperature melting waxes, UV curable resins, thermocurable resins, hot-melt resins, and mixtures thereof.

10. The process according to claim 8, wherein said hardenable material is chosen from the group consisting of linear polyethylene waxes having a molecular weight of about 2000.

11. The process according to claim 7, wherein said preparing composite particles including a sacrificial material and said first species and said second species of charged particles comprises
    melting said sacrificial material;
    incorporating said first and said second species of charged particles into said sacrificial material; and
    forming said mixture into composite particles.

12. The process according to claim 11, wherein said composite particles have a shape chosen from spherical shapes, discoid shapes and cylindrical shapes.

13. The process according to claim 11, wherein said forming said mixture into composite particles comprises forming cylindrically shaped composite particles by extrusion or injection molding.

14. The process according to claim 7, wherein said removing said sacrificial material comprises diffusing said sacrificial material through said film.

15. The process according to claim 7, wherein said sacrificial material is chosen from the group consisting of linear polyethylene waxes having a molecular weight of about 400.

16. The process according to claim 7, wherein said transparent polymeric material is at least one polymer chosen from the group consisting of elastomeric materials.

* * * * *